United States Patent [19]

Alvesalo et al.

[11] Patent Number: 5,561,840
[45] Date of Patent: Oct. 1, 1996

[54] METHOD AND SYSTEM FOR LOCATION-UPDATING OF SUBSCRIBER MOBILE STATIONS IN A MOBILE RADIO NETWORK BY A COMBINATION OF MOBILE INITIATED LOCATION UPDATING OF SOME MOBILE STATIONS AND NETWORK-INITIATED LOCATION UPDATING OF OTHERS

[75] Inventors: Antero Alvesalo, Helsinki; Sanna Mäenpää, Espoo; Seija Salmela, Masala, all of Finland

[73] Assignee: Nokia Telecommunications Oy, Espoo, Finland

[21] Appl. No.: 185,856

[22] PCT Filed: May 24, 1993

[86] PCT No.: PCT/FI93/00218
§ 371 Date: Jun. 9, 1994
§ 102(e) Date: Jun. 9, 1994

[87] PCT Pub. No.: WO93/25050
PCT Pub. Date: Dec. 9, 1993

[30] Foreign Application Priority Data

May 25, 1992 [FI] Finland .................................. 922383

[51] Int. Cl.⁶ ............................................ H04Q 7/20
[52] U.S. Cl. .................. 455/33.1; 455/54.2; 455/56.1; 379/57; 379/61
[58] Field of Search ......................... 455/33.1, 53.1, 455/54.1, 54.2, 56.1, 33.4; 379/57–60, 61

[56] References Cited

U.S. PATENT DOCUMENTS

| | | | |
|---|---|---|---|
| 4,700,374 | 10/1987 | Bini | 379/60 |
| 4,833,702 | 5/1989 | Shitava et al. | 379/60 |
| 5,054,110 | 10/1991 | Comroe et al. | 455/33.1 |
| 5,109,400 | 4/1992 | Patsiokas et al. | 379/60 |
| 5,153,902 | 10/1992 | Buhl et al. | 379/60 X |
| 5,353,331 | 10/1994 | Emery et al. | 455/54.1 X |
| 5,357,561 | 10/1994 | Grube | 379/60 |

FOREIGN PATENT DOCUMENTS 454647  9/1992  European Pat. Off. .

OTHER PUBLICATIONS

Goodman, 'Trends in Cellular and Cordless Communications' IEEE Communications Magazine, Jun., 1990.

Primary Examiner—Reinhard J. Eisenzopf
Assistant Examiner—Philip J. Sobutka
Attorney, Agent, or Firm—Cushman Darby & Cushman, L.L.P.

[57] ABSTRACT

A method for location updating in a cellular radio network. The network stores subscriber data permanently in a home location register (HLR) and temporarily in visitor location registers (VLR) integrated with mobile services switching centers (MSC). In connection with a call setup, the HLR requests the VLR to provide routing information for the subscriber, whereafter the inbound call is routed to the pertinent MSC and the subscriber is paged by the radio path. The network updates the location of the subscriber by check paging performed as a background run at suitable times.

8 Claims, 3 Drawing Sheets

METHOD AND SYSTEM FOR LOCATION-UPDATING OF SUBSCRIBER MOBILE STATIONS IN A MOBILE RADIO NETWORK BY A COMBINATION OF MOBILE INITIATED LOCATION UPDATING OF SOME MOBILE STATIONS AND NETWORK-INITIATED LOCATION UPDATING OF OTHERS

BACKGROUND OF THE INVENTION

The invention relates to a method for location updating in a cellular radio network comprising a home location register for permanently storing location and subscriber data on subscriber mobile stations registered with the network, the geographic coverage area of the network being divided into smaller service areas each comprising a mobile services switching center and a visitor location register for temporarily storing subscriber data on mobile subscriber stations currently located within said service area; the geographic coverage area of each service area being further divided into location areas comprising cells, each of which incorporates at least one fixed radio station capable of establishing a radio link with the active subscriber mobile stations currently located in the cell, the network comprising base stations and subscriber mobile stations in a first system, said subscriber mobile stations automatically informing the network of their location area via base stations to update location data, and base stations and mobile stations in a second system, the mobile stations not automatically informing the network of their location.

Cordless telephone (CT) systems, such as the digital cordless telephone system CT2, have recently come out on the market. Such a system comprises a base station, which is always based on access to an existing fixed telephone network. There are three main types of base stations: a residential base station, a base station connected to a private branch exchange (PBX) in an office or operating independently as a PBX, and telepoint base stations, from which only outbound calls are possible for a CT telephone.

Since the present-day CT systems are regarded as PSTN subscriber connections (access points), a call is addressed to the CT terminal equipment in the normal way by dialing a telephone number in accordance with the PSTN numbering scheme. On the basis of the telephone number, the PSTN then routes the call to a respective subscriber connection to which the CT residential base station or the PBX of the CT office base station is connected. The base station pages the CT terminal equipment over the radio path by means of an identity code determined by the numbering scheme of the CT system, and sets up a call when the terminal equipment responds. In practice, it is thus possible to make a call to the CT terminal equipment only through its residential or office base stations (through predetermined subscriber connections).

Accordingly, the numbering schemes of the present CT systems serve only the CT radio link and are not utilized anywhere in the PSTN.

In the future, it may become advantageous to be able to connect CT systems even to mobile radio networks. As there are no addressable access points (such as PSTN subscriber connections) but only traffic channels used commonly by mobile subscriber equipment, the communication setup is always based on the use of an identity code assigned to the subscriber equipment.

Problematic for the integration of the CT system and the mobile phone system are for example their different numbering schemes and authentication procedures. Solutions to these problems have been disclosed in the Applicants' earlier Finnish patent applications FI910211 and FI920792 (unpublished on the filing date of the present application).

In a cellular radio network, the subscriber can roam freely within the radio coverage area of the network, in which event the network must have information on the location of the subscriber equipment in order that a call to the subscriber may be set up. In the present cellular radio networks, location updating is based on automatic location updating carried out by the subscriber equipment while roaming within the area of the network. In call setup, the subscriber equipment is paged only in the area within which it has communicated to be located last. However, for instance the CT system has no specification of any automatic location updating carried out by the subscriber equipment, and therefore there is no certainty of the location of the subscriber equipment in the network. The valid location information has usually been received in connection with the last call. Thus the setup of an inbound call to such a subscriber similarly as to a normal subscriber to the mobile telephone network would often lead to failure of call setup.

A slight relief to the problem presented by the inaccuracy of location data is offered by the mobile phone system disclosed in EP Patent Application 454 647, in which paging of the mobile telephone and setup of a radio link with the mobile telephone is performed before the call is routed through the network to the mobile telephone. If the paging does not reach the mobile telephone, the call is not routed at all, which reduces needless use of the resources of the transmission network. The paging of the mobile telephone can be performed, besides the area of the exchange in which the mobile telephone is located according to the location data, also within the area of exchanges neighboring the exchange. Such extended paging can be initiated immediately, or it can be proceeded to when the first paging attempt in the primary service area fails. However, in the case of the CT system, this solution leads substantially often to the use of additional paging and thereby to extended call setup times.

SUMMARY OF THE INVENTION

It is an object of the invention to diminish the above problems.

This is achieved with the method of the type set forth in the first paragraph, which according to the invention is characterized in that the home location register HLR of the subscriber mobile station in the second system sends a command to perform check paging of the subscriber mobile station to update location data at suitable times to the visitor location register VLR within the area of which the subscriber mobile station is located according to the location data of the HLR, upon which the VLR a) as a result of successful check paging, updates its location data and informs the VLR of the location of the subscriber mobile station, b) after a failed check paging, informs the HLR that the subscriber mobile station was not found, as a result of which the HLR updates the location data of the subscriber mobile station.

The basic idea of the invention is that the location of the subscriber is checked and updated by performing check paging in the area indicated by the location data or in a wider area as background runs at suitable times, for instance during low traffic intensity, without call setup. The subscriber station responds automatically, and the user is not aware of the connection. Thus correct location data for the subscribers can be better maintained. If the subscriber is found in the check paging, the location data need not be updated.

If the subscriber equipment is not found in the check paging in the location area last registered, the subscriber is paged in a wider area. This wider area in which the check paging is performed may be the same for all subscribers. Alternatively, performing the additional paging and the paging area used therein may be dependent on the type of subscriber (for instance CT subscriber) or type of call (for instance emergency call). In the most preferred alternative, the initiation of the additional paging and the paging area used therein are defined to be subscriber-specific, and thus the subscriber can agree with the network operator about which areas he is paged in. Thus, the HLR can allow inclusion of information on the paging area to be used in the check paging in the routing information request to be sent to the VLR. Preferably, the additional paging is gradually extended in such a way that it is started for instance in the area of several location areas, and when the paging still fails the area is extended to cover for instance the entire service area, several service areas, and finally the entire network. Upon being extended to other service areas, the paging may also be directed to specific location areas in each service area.

By means of the invention, the chances of succeeding in call setup and the accessibility of the subscriber can be substantially improved in cases where the location data of the subscriber are not valid, as for instance in the case of a CT subscriber.

BRIEF DESCRIPTION OF THE DRAWINGS

The invention will be described in the following by means of illustrating embodiments with reference to the accompanying drawings, in which.

DETAILED DESCRIPTION

In the following, the invention will be described by means of an example in which a digital cordless telephone system CT2 is connected to form part of the digital mobile radio system GSM, which in fact is the primary application of the invention. The method of the invention can, however, also be applied in connecting other cordless telephone systems, such as the DECT (Digital European Cordless Telecommunications) to the GSM or its modifications or to other similar mobile radio systems. Furthermore, the method of the invention can be applied simply to a conventional mobile radio system for use by its normal subscribers.

The basic configuration and basic facilities of the GSM mobile radio system are well-known to those skilled in the art and are relatively accurately defined in the GSM system specifications. Hereinbelow a few basic concepts and elements of the GSM system will be defined with reference to FIG. 1. An area within which GSM mobile radio services are available is called a GSM network (GSM service area) and may cover several countries. The GSM network may be divided into national GSM networks (PLMN service area), which means the area of one operator providing GSM services. There may also be several GSM networks in one country, and their coverage areas may overlap geographically. In the following exposition, the GSM network primarily refers to such a "national" network.

The GSM network may comprise one or more service areas, which means an area within which services are provided by a single mobile services switching center MSC. The service area in the GSM may further be divided into one or more location areas, i.e. an area covered by one or more radio cells. A cell refers to the smallest geographical area of the system, comprising one or more fixed radio stations or base stations and using predetermined traffic channels.

The GSM network comprises at least one home location register (HLR), which is a database in which mobile radio data, such as location data, are stored permanently. The HLR generally incorporates an integrated or a separate authentication center AC in which the subscriber's authentication data and algorithms are stored. The system further comprises several visitor location registers (VLR), each associated with one or more service areas. Each service area, however, has only a single VLR. The VLR is a database in which mobile radio data are stored while the mobile radio MS visits the area of the VLR. The VLR has information on the location of the mobile radio MS with an accuracy of one location area. The HLR in turn has information on the VLR that the mobile radio MS visits, and provides routing information to the telephone network for calls terminating in the mobile telephone MS. The HLR in turn receives the required routing information from the VLR. The HLR and the VLR have solely a signalling connection with the other components of the mobile radio network.

Figure 1:
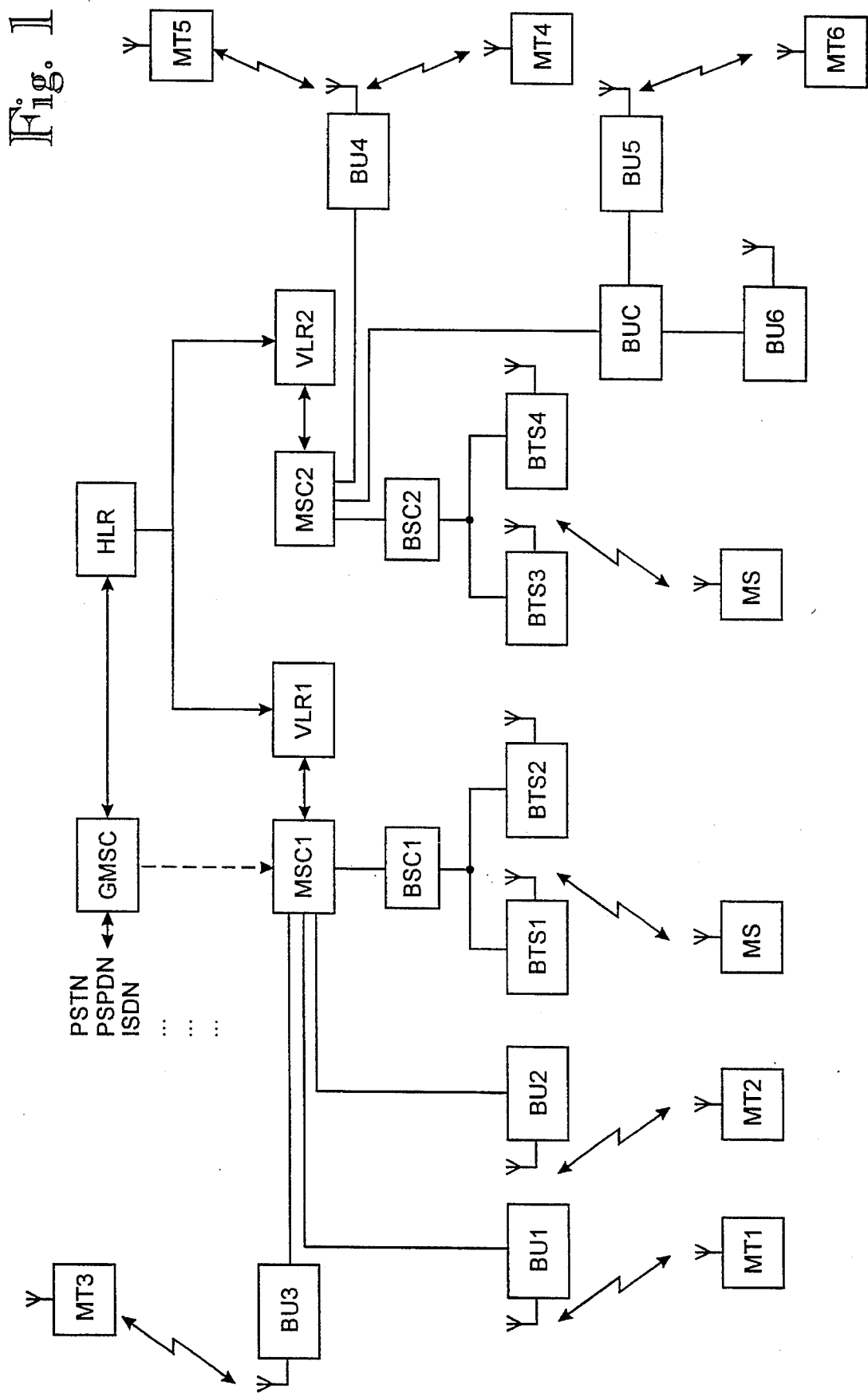
FIG. 1 is a schematic representation of a cellular mobile radio system in which the method of the invention can be applied.

In the example of FIG. 1, each service area has its own visitor location register VLR integrated with the mobile or radio switching center MSC of that particular service area.

FIG. 1 illustrates two service areas, one with a mobile services switching center MSC1 and a visitor location register VLR1 and the other with a mobile services switching center MSC2 and a visitor location register VLR2 for the traffic control. There are one or more location areas under the service area covered by the two switching centers MSC1 and MSC2, and within each location area a respective base station controller BSC1 and BSC2 controls several fixed radio stations or base transceiver stations BTS. Each radio cell referred to above comprises one base station BTS, and one base station controller BSC provides services to several cells. A mobile radio MS located in the cell establishes a duplex radio link with the base transceiver station BTS of the cell. A signalling connection and voice channels are provided between the base station controller BSC and the mobile services switching center MSC.

The GSM network usually communicates with other networks, such as the public switched telephone network (PSTN), another mobile network (PSPDN) or an ISDN network, through a specific mobile services switching center called a gateway MSC.

According to one embodiment of the invention, the cordless telephone system CT2 is integrated as a subsystem for the GSM system, for example by connecting the CT2 base stations BU under the control of the mobile services switching centers MSC. In FIG. 1, the CT2 base stations BU1, BU2 and BU3 are connected to MSC1, and the CT2 base stations BU4 and BU5 are connected to MSC2. Further, the base station controller BUC, which may in practice be for instance a telephone exchange PABX operating in compliance with the CT2 specification and controlling base stations BU5–BU6, is connected to MSC2. The mobile services switching centers MSC and the CT2 base stations BU and base station controllers BUC are provided with suitable supplementary equipment and software for combining the mobility functions of the systems and for matching the number schemes of the systems. For the requirements of GSM network management, the base stations BU may be defined into location areas, each of which may have one or more base stations BU.

In principle, the GSM transmission network may handle CT2 subscribers similarly as actual GSM subscribers, even though the CT2 and GSM are fully separate radio systems at least on the radio path level.

The connection of the CT2 system to the GSM system and for example the adaptation of the numbering and authentication have been described in Finnish Patent Applications FI910211 and FI920792.

According to the CT2 common air interface (CAI) specification, the signalling over the radio path between the CT2 base station BU and the CT2 terminal equipment MT is in compliance with the CT2 Common Air Interface (CAI) specification, described for instance in *CT2 Common Air Interface*, M. W. Evans, British Telecommunications Engineering, Vol. 9, July 1990, pp. 103–111.

As stated previously, in a cellular radio network the subscriber can roam freely within the radio coverage area of the network, in which event the network must have information on the location of the subscriber equipment in order that a call to the subscriber may be set up. In the present cellular radio networks, such as the GSM, location updating is based on automatic location updating carried out by the subscriber equipment while roaming within the area of the network. In call setup, the subscriber equipment is paged only in the area within which it has communicated to be located last.

Figure 2:
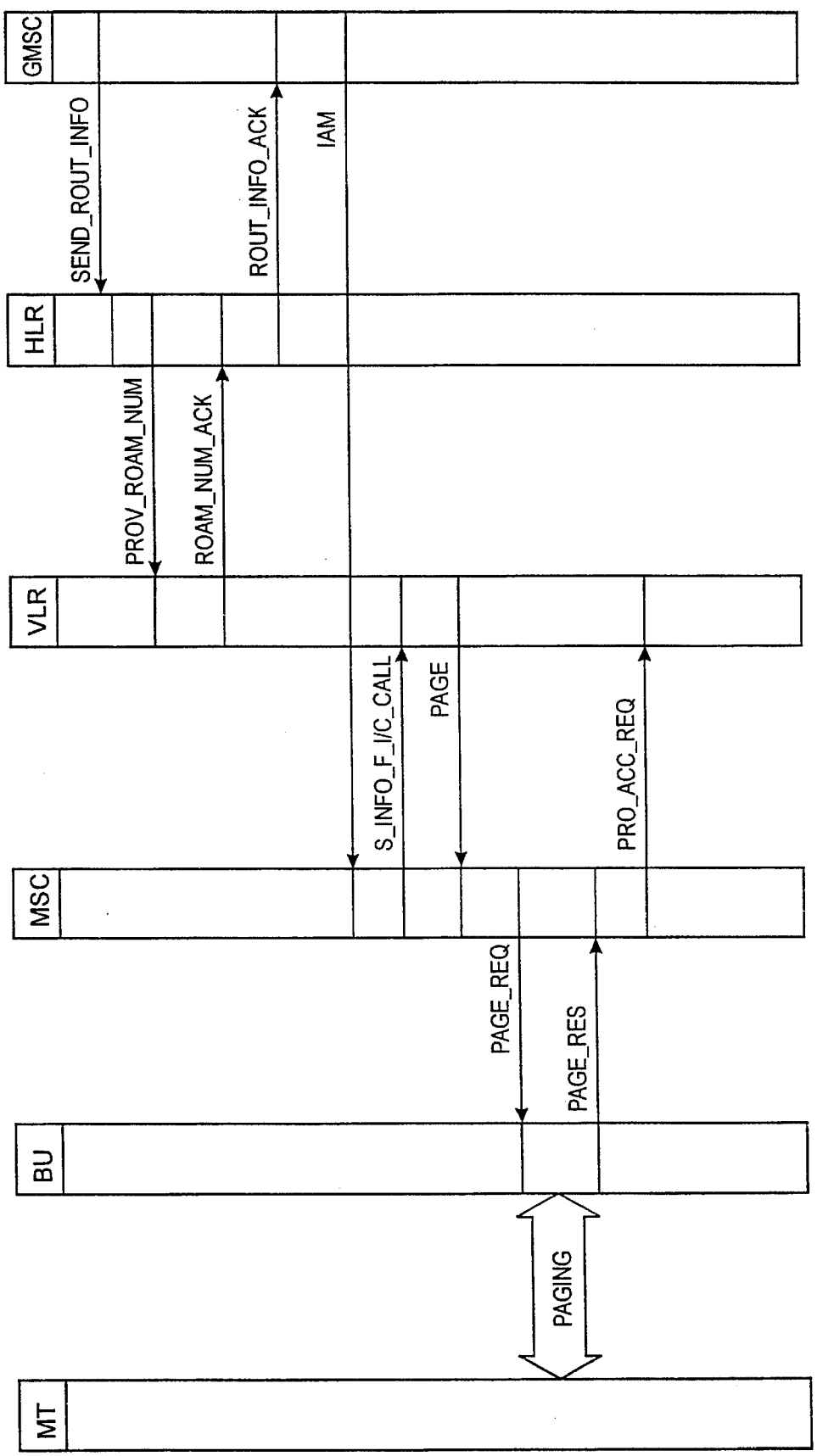
FIG. 2 is a signalling diagram illustrating a typical call setup process in the GSM system.

FIG. 2 shows a signalling diagram in which the setup of an inbound call to a CT2 subscriber MT is performed in compliance with the GSM recommendation. The mobile services switching center, in this case the gateway MSC (GMSC), receives an international telephone number (international ISDN number) of a MT from A-subscriber from another network, and forwards it to the home location register HLR of the mobile telephone network, requesting it to provide routing information (SEND_ROUT_INFO). Alternatively, the HLR may receive the routing information request from the switching center of another telecommunications system, such as an ISDN switching center. The HLR again checks from its data file the visitor location register VLR within the area of which the mobile telephone MT having this particular ISDN number is currently located, and requests this VLR to provide a roaming number by sending it an international mobile station identifier (IMSI) used in the mobile telephone network (PROV_ROAM_NUMBER). The VLR assigns a roaming number (MSRN) to the mobile telephone MS for this call and sends it to the HLR (ROAM_NUM_ACK). The HLR forwards (ROUT_INFO_ACK) the roaming number MSRN as routing information to the gateway MSC (GMSC) (or to another switching center that requested it) which, by utilizing this routing information, routes the inbound call to the MSC of the particular VLR, said MSC requesting the VLR to provide information on the location area of the mobile telephone MT (S_INFO_F_I/C_CALL) and initiating the paging (PAGE) of the mobile telephone within that location area in which the mobile telephone should be located according to the information of the VLR, by sending to the CT2 base station BU a paging request (PAGE_REQ) comprising at least the identifier of the subscriber equipment or subscriber. The CT2 base station BU performs paging of the mobile telephone (PAGING) in compliance with the CAI specification, and subsequent to a successful paging, an acknowledgement is sent (PAGE_RES) to the switching center MSC and further to the VLR (PRO_ACC_REQ). Thereafter a call is set up between the A-subscriber and the mobile telephone MT.

However, a problem is presented by the fact that for instance the CT system has no specification for automatic location updating to be performed by the subscriber equipment, and therefore there is no certainty of the location of the subscriber equipment in the network. The valid location information has usually been received in connection with the last call. Thus the setup of an inbound call to such a subscriber similarly as to a normal subscriber in the mobile telephone network would often lead to failure of call setup, as the subscriber cannot be found within the area indicated by the location data. Furthermore, in such a case transmission resources between mobile services switching centers are unnecessarily occupied.

Figure 3:
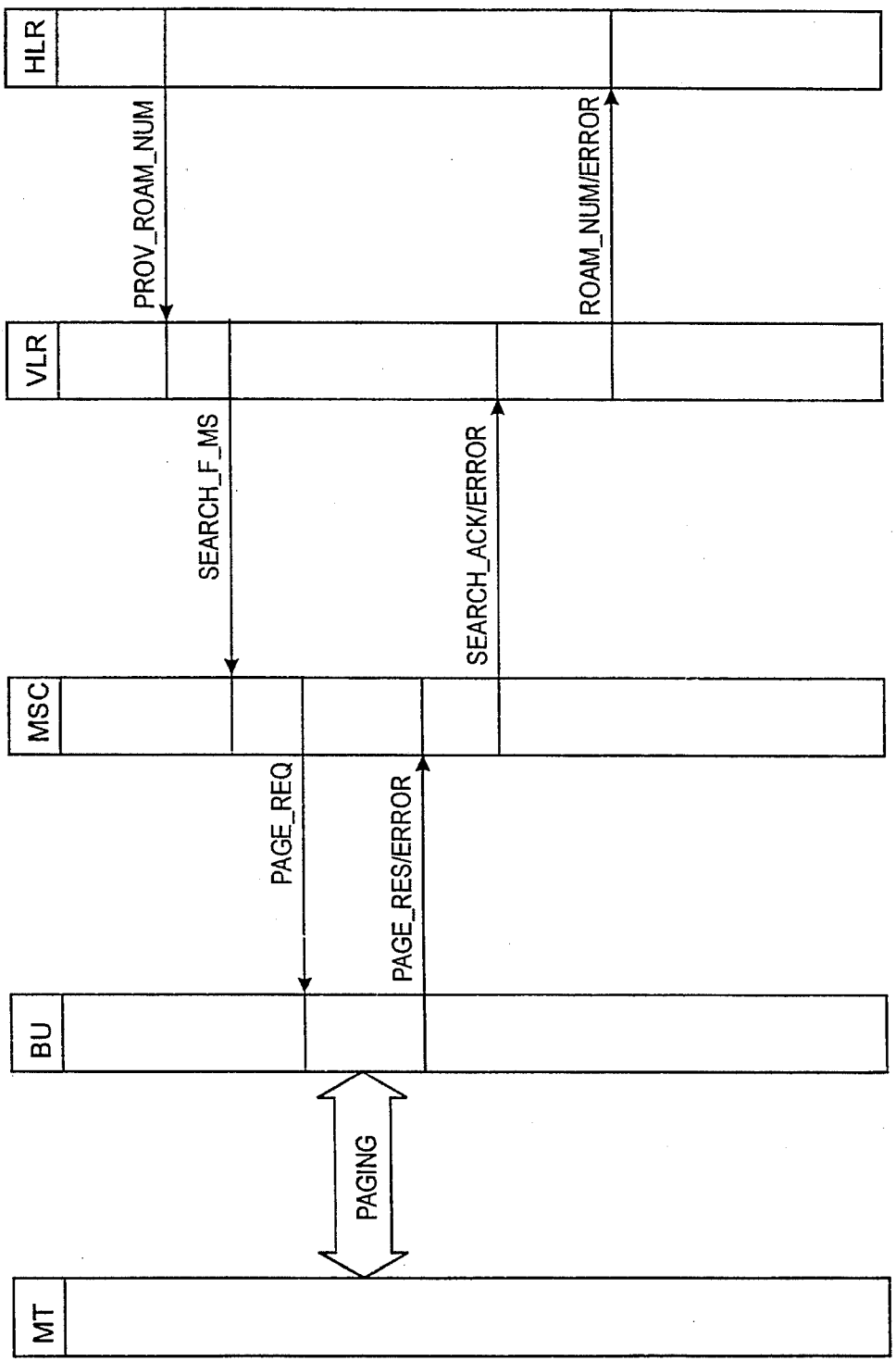
FIG. 3 is a signalling diagram illustrating a subscriber location check performed as a background run in accordance with the invention.

In accordance with the invention, this problem is relieved by updating the location data at suitable times, for instance during low traffic intensity, by means of specific check paging. The signalling employed in the check paging is for example in accordance with FIG. 3. The HLR initiates the check paging without any external routing information request.

The HLR checks from its data file the VLR within the area of which the mobile telephone MT to be paged is currently located and requests this VLR to provide a roaming number by sending it a message (PROV_ROAM_NUMBER) comprising at least an international mobile station identifier IMSI used within the mobile telephone network and a command to initiate immediate check paging of the subscriber. Upon receipt of the command, the VLR does not immediately provide the roaming number, as is the normal procedure, but sends the MSC a paging command (SEARCH_FOR_MS) comprising at least a subscriber identifier (IMSI). The MSC initiates the paging of the mobile telephone (PAGE) by sending the CT2 base station BU a paging request (PAGE-REQ) comprising at least the identifier of the subscriber equipment or subscriber (IMSI). The CT2 base station BU performs the paging of the mobile telephone (PAGING) in compliance with the CAI specification, and subsequent to a successful paging an acknowledgement (PAGE_RES) is sent to the switching center MSC and further to the VLR (SEARCH_ACK). Thereafter the VLR updates the location data of the mobile telephone and sends the roaming number (ROAM_NUM) or some other information on successful paging to the home location register HLR. The HLR updates the location data of the mobile telephone.

If the mobile telephone MT is not found, the BU sends the MSC a negative acknowledgement (PGE_ERROR) and the MSC forwards it to the VLR (SEARCH_ERROR). The VLR can then extend the paging to be performed in a wider area than that indicated by the location data. Preferably the check paging is extended gradually to cover several location areas and thereafter the entire service area/VLR area. If the MT is not found in the VLR area in which it should be located according to the location data of the HLR, the VLR erases the location data of the mobile telephone MT and sends information on the absence of the mobile telephone to the HLR in the normal way. The HLR can then initiate the paging of the MT in the area of another VLR or in the entire network. After the MT has been found, the HLR updates the location data of the MT with the identifier of the new VLR. If the MT is not found, the HLR sets the location of the MT as unknown in the location data.

In the primary embodiment of the invention, the HLR stores in its subscriber data file subscriber-specific data on special operations to be performed to locate the subscriber, e.g. whether the subscriber is to be check paged upon failure of the first paging, and the area in which the check paging is to be performed, and the steps of enlarging the paging area. In that case, the check paging may be a service provided by the network operator that can be purchased by the subscriber, who in that connection determines the paging area he desires. Automatic determination of the specific extended paging area is also possible by using statistics gathered on the mobility of the subscriber. Thus the check paging is performed primarily in areas in which the subscriber is "most apparently" located. In that event, the command sent by the HLR may comprise information on the area in which the extended paging is to be performed. Alternatively, the paging area information may be transferred from the HLR to the VLR in connection with the other subscriber data when the mobile telephone MT registers in the area of the VLR for the first time. The VLR then indicates the paging area in the paging command to the MSC (SEARCH_FOR_MS).

The initiation of the check paging and the paging area employed can be set to be dependent on various factors. The check paging area and its extension may be similar for all subscribers in the network in the area of one VLR. The check paging and paging area may also be different for different subscriber types (for example, CT2 or DECT subscriber) or for different call types (for example, in an emergency call the paging is immediately extended to the entire service area).

The figures and the description pertaining thereto are only intended to illustrate the present invention. In its details, the method of the invention may vary within the scope of the appended claims.

We claim:

1. A method for location updating in a cellular radio network comprising base stations and mobile stations of a cellular system, the mobile stations having an automatic mobile station-initiated location updating, cordless base stations and cordless telephones of a cordless telephone system connected to said cellular network, the cordless telephone system having no automatic location updating, a home location register for storing location and subscriber data on all mobile and cordless subscribers of the cellular radio network, service areas each comprising a mobile services switching center and a visitor location register, the visitor location register storing location and subscriber data on those of said mobile and cordless subscribers visiting the respective service area, said location updating method comprising:

updating the location of cordless subscribers by a network-initiated location updating procedure, said procedure comprising:

sending, at suitable intervals not involving call set-up, a cordless subscriber paging command from the home location register to the visitor location register indicated by the location data of the respective cordless subscriber in the home location register, paging, by the visitor location register, the respective cordless subscriber in response to said cordless subscriber paging command, updating, in response to receiving a paging response from the respective cordless telephone, the location data of the respective cordless subscriber in the visitor location register, and sending positive paging acknowledgement from the visitor location register to the home location register, erasing, in response to not receiving a paging response from the respective cordless telephone, the location data of the respective cordless telephone in the visitor location register, and sending a negative acknowledgement from the visitor location register to the home location register.

2. A method as claimed in claim 1, further comprising:

sending the cordless telephone paging command from the home location register to at least one other visitor location register, in response to said negative paging acknowledgement from the visitor location register.

3. A method as claimed in claim 1, wherein said paging comprises:

carrying out the paging within a first area indicated by said cordless telephone paging command.

4. A method as claimed in claim 3, wherein said paging further comprises:

extending the paging beyond the first area within the service area of the visitor location register, in response to not receiving a paging response from said first area.

5. A method as claimed in claim 1, wherein said paging comprises:

carrying out the paging within a first area indicated by the location data in the visitor location register.

6. A method as claimed in claim 5, wherein said paging further comprises:

extending the paging beyond the first area within the service area of the visitor location register, in response to not receiving a paging response from said first area.

7. A method as claimed in claim 1, wherein said paging comprises:

carrying out the paging within a first area indicated by the subscriber data of the respective cordless subscriber.

8. A method as claimed in claim 7, wherein said paging further comprises:

extending the paging beyond the first area within the service area of the visitor location register, in response to not receiving a paging response from said first area.

* * * * *